Figure 1:
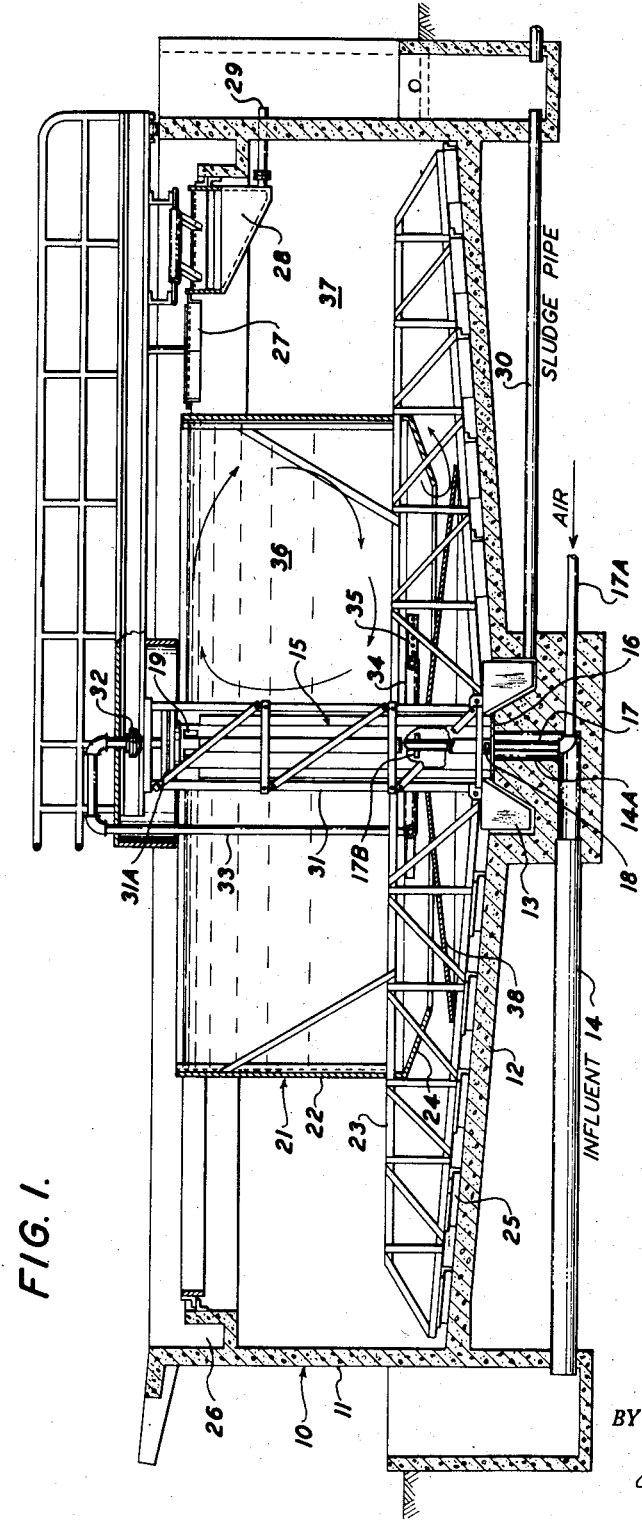

Aug. 4, 1953 E. M. KELLY ET AL 2,647,870
CLARIFICATION
Filed May 22, 1951 2 Sheets-Sheet 2

INVENTORS.
EARL M. KELLY
ARTHUR M. KIVARI
BY
*James B. Christie*
ATTORNEY

Patented Aug. 4, 1953

2,647,870

UNITED STATES PATENT OFFICE 2,647,870

CLARIFICATION

Earl M. Kelly, Burlingame, and Arthur M. Kivari, Los Angeles, Calif., assignors to Process Engineers Incorporated, San Francisco, Calif., a corporation of California Application May 22, 1951, Serial No. 227,682

4 Claims. (Cl. 210—3)

This invention is concerned with clarification, particularly clarification of sewage, and provides improved apparatus for clarification, i. e. the flocculation and settlement of finely divided solids from liquid suspensions, such, for example, as sewage and industrial wastes. This is a continuation-in-part of our co-pending application, Serial No. 194,752, filed November 9, 1950.

Clarification ordinarily is conducted by introducing the suspension to be clarified into a tank in which solids are settled out, the clarified liquid being removed at an overflow and the settled solids being raked to and discharged as a sludge from a so-called "sludge pit" at the bottom of the tank. Settlement may be increased by flocculation or agglomeration of the finely divided solids in the original suspension. It has been suggested theretofore that settling rate and clarifier capacity can both be increased by returning some of the settled sludge into the upper portion of the pool undergoing clarification, the returned sludge providing nuclei to which more finely divided solids may attach, for example, by agglomeration or adsorption.

It is also known that flocculation and settlement may be enhanced if the sludge is returned to the upper portion of the pool in which settlement occurs in an aerated mixture with the fresh feed, for example raw sewage, flowing to clarification.

As a result of our investigations as described in the aforementioned co-pending application, we have discovered that the rate of settlement or clarification can be increased markedly if the solid content of the aerated mixture of returned sludge and fresh feed contains a substantially higher proportion of solids than that in the incoming feed. To that end we described and illustrated clarification apparatus in said co-pending application which comprises generally a sedimentation tank having a bottom which slopes toward a sludge outlet at or near its center, a conventional raking mechanism mounted to move over the bottom to carry settled sludge toward the outlet, a concentric annular baffle disposed in the tank and extending from a point above the rake to a point above the liquid level in the tank to provide an inner mixing zone and an outer annular quiescent zone. The apparatus heretofore described also included a central airlift column to which raw sewage is introduced at a point near the bottom and into which settled sludge is drawn to mix with the raw sewage, before discharge from the column at a point near the liquid level in the tank. To concentrate the sludge adjacent the airlift column, the apparatus included a central roof or substantially horizontal baffle mounted above the rake and beneath the annular baffle to provide a quiescent zone in the bottom of the tank in the neighborhood of the sludge pit. The roof has the effect of inducing additional thickening of the sludge in the protected area of the tank bottom.

We have now found that coagulation in the zone defined within the aforementioned annular baffle is materially increased if the raw sewage and returned sludge introduced therein is aerated and agitated to an extent considerably greater than that heretofore feasible. However, this greatly increased aeration and agitation cannot be carried out in conventional apparatus nor in the apparatus illustrated in the aforementioned co-pending application for the reason that the degree of agitation and aeration sought is such as to keep in a constant state of agitation the sludge at the bottom of the tank and prevent migration thereof toward the sludge pit.

The present invention is directed not to the concept of increasing aeration, which in this particular aspect is a matter of degree, but rather to apparatus enabling a degree of aeration and agitation heretofore considered impossible. In one form apparatus in accordance with the invention comprises in a tank for containing a pool of liquid to be clarified and in which sludge settles to the bottom, a sludge outlet in the bottom of the tank near the center thereof, raking means for moving the sludge along the bottom of the tank to the outlet, and an annular baffle in the tank spaced from the center and outside wall of the tank to form an inner agitation zone and an outer annular quiescent zone within the tank, the combination comprising a roof mounted above the raking means and below the lower end of the annular baffle, the roof being at least substantially as large as the open lower end of the annular baffle.

In preferred construction the aforementioned roof is in the shape of a relatively flat cone and defines an area substantially coaxial with the bottom opening of the annular baffle and somewhat larger than this bottom opening. The peak of the roof may actually project into the area defined by the baffle, with the outer circumference of the roof being spaced below the bottom opening to permit circulation of sewage from the inner agitation zone to the outer quiescent zone around the lower edge of the baffle. The defined construction is similar to that illustrated and described in the aforementioned co-pending application, differing therefrom in the provision of a roof intermediate the lower end of the baffle and raking means which is at least substantially as large as the bottom opening of the baffle and preferably somewhat larger than this opening. The effect of the construction herein defined is to permit aeration and agitation within the confines of the baffle to a substantially unlimited extent without disturbing the sludge migrating toward the sludge outlet.

Apparatus in accordance with the present invention may or may not include a central airlift, in any case sewage and recirculated sludge being introduced to the body of liquid within the confines of the annular baffle well above the roof and preferably closely adjacent to the surface of the body of liquid. Such introduction and recirculation of sludge may be accomplished by means of an airlift as described in our earlier application or by other means familiar to those skilled in the art.

If the apparatus includes an airlift, the roof member circumscribes this member and is conveniently mounted to and supported by the sludge rake framework revolving with the raking means and the annular baffle about the central airlift column. In such embodiment the airlift column traverses the apex of the roof member giving it the appearance of the frustrum of a cone when the preferred conical shape is employed. If an airlift column is not employed, the roof structure of the invention is similarly suspended from the baffle by means of braces or from the rake suspension means, and as so suspended will again rotate with the baffle and raking means about the vertical axis of the tank.

Figure 2:
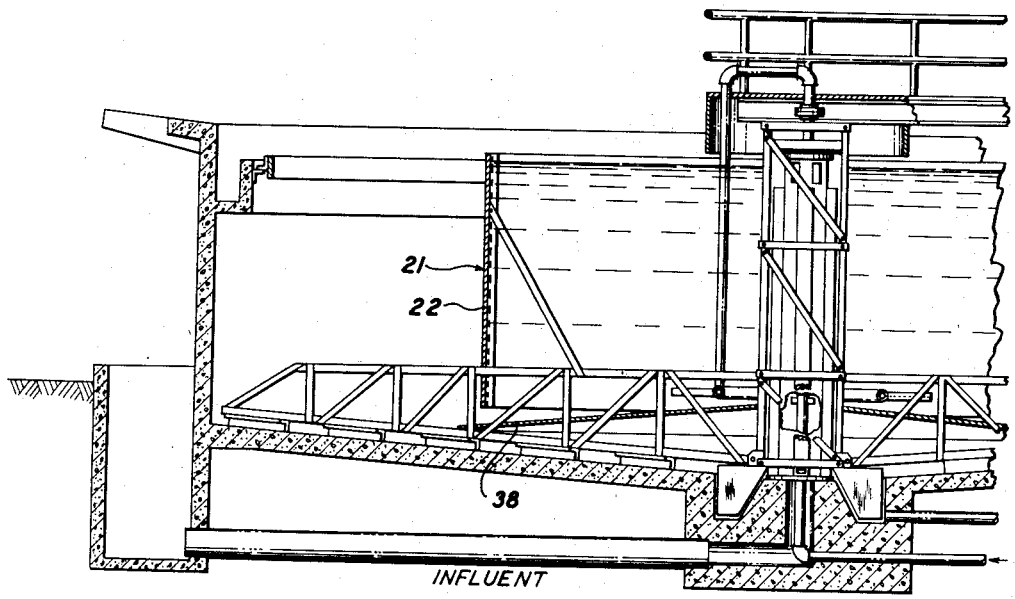

The invention will be more clearly understood from the following detailed description thereof taken in conjunction with the accompanying drawing in which:

Fig. 1 is an elevation, partly in section, through one form of the clarifier of the invention; and Fig. 2 is an elevation, partly in section, of a portion of another form of the clarifier of our invention.

Referring to Fig. 1, the apparatus there shown comprises a round concrete tank 10 having a vertical outside wall 11 and an inverted frusto-conical bottom 12. The bottom slopes gently to an annular sludge pit 13 substantially at the center of the apparatus. Influent to be clarified, say raw sewage, is introduced from beneath the apparatus through a pipe 14 and a riser 14A from which it flows into a stationary vertical central column 15 that rests on a central pier 16, the latter defining the inside wall of the annular sludge pit. The central column is provided with a plurality of inlet ports 18 immediately above the pier. These ports open into the tank adjacent the sludge pit and permit entry of sludge to be recirculated up the central column. The column terminates near the top of the tank and is provided with a series of outlet ports 19 through which an aerated mixture of returned sludge and fresh feed is discharged into the upper portion of the pool retained in the tank and within the confines of the annular baffle.

The central column performs the triple function of mixing the incoming feed and the returned sludge, aerating the mixture, and airlifting the mixture to and through the discharge ports at the top of the column. Air is discharged into the column through a vertical pipe 17 that runs up through it and which is fed with compressed air at the bottom through a horizontal inlet pipe 17A. At a point in the column above the sludge entry ports 18, the pipe carries a plurality of air jets 17B which discharge into the column and bring about the triple action described above. An airlift column of the type illustrated and described is not essential to the apparatus of the present invention and constitutes merely a presently preferred means for introducing raw feed returned sludge and air in intimate mixture into the agitation zone. A common variation of this means involves withdrawal of the sludge from the pit 13, addition of a portion thereof into the incoming raw sewage, aeration of the combined streams and discharge by conduit means into the upper portion of the liquid pool in the tank.

An annular baffle 21 is disposed in the tank about midway between the central column and the outside wall dividing the tank into an inner zone 36 in which agitation is accomplished and an outer annular quiescent zone 37 where settling occurs. The baffle has an upright portion 22 which rides on a conventional rake mechanism 23 rotating therewith around a central vertical axis. In the particular embodiment shown in Fig. 1, the baffle 21 is provided with a lower inwardly sloping inverted frusto-conical section or lip 24 reducing the area of the bottom opening of the baffle. The rake structure is provided with rakes 25 which move sludge settled into the bottom of the tank in spiral paths downwardly over the tank bottom into the sludge pit. Sludge settling into the bottom of the sludge pit is withdrawn through a sludge pipe 30. The rake mechanism is fastened to a rotatable cage 31 concentrically mounted around the central column 15. The cage is supported on a bearing 31A at the top of the column and is rotated by conventional means (not shown).

Clarified effluent from the operation overflows at the top of the apparatus into an annular launder 26. A conventional skimmer mechanism 27 for the removal of froth, scum, etc., is provided at the top of the tank and discharges into a scum box 28 from which the scum flows out through a pipe 29.

The air pipe 17, which supplies the air for the airlift, extends upwardly through the top of the central column, thence through a rotatable joint 32. This is connected to an air pipe 33 that supplies an air manifold 34 carried by the rake structure. Projecting from the air manifold are radial air diffusers 35 through which air is discharged into the agitation zone defined by the baffle 21.

A frusto-conical roof or guard 38 is fastened to the rake support cage 31 and overlies the sludge pit, there being a gap below the roof so that sludge may be removed by the rakes into the region of the pit. Distinguishing from the apparatus defined in the aforementioned copending application, the roof 38 is enlarged to the extent that it covers an area exceeding the area of the bottom opening of the baffle 21 as defined by the inverted frusto-conical lip 24, and is substantially coaxial with this opening. There is a gap above the roof between the lower edge of the baffle 21 to permit circulation between the inner and outer zones 36, 37 respectively, of the sedimentation tank.

The roof 38 is shown as exceeding the area of the bottom opening of the baffle member. Such is preferred construction, although we have found that the roof may be slightly smaller than the bottom opening of the baffle without materially altering its effect.

The roof 38 protects the entire bottom of the sedimentation tank beneath the lower opening of the baffle so that agitation within the agitation zone defined by the baffle and irrespective of the violence of such agitation will not disturb sludge accumulation on the bottom of the sedimentation tank in the area beneath the baffle. Circulation within the agitation zone is sufficient to prevent sludge settlement on the roof 38, which has been found in practice to remain clean through an indefinite period of operation. In its preferred form, the roof is frusto-conical, as illustrated, or is conical if the airlift column 15 is not employed. In this latter event, the roof is preferably constructed in two sections, an inner section mounted within the cage 31 and an outer annular section forming a continuation of the inner section mounted exteriorly of the cage 31. The roof 38 may be disk-shaped, i. e. flat rather than frusto-conical, circulation within the agitation space being normally sufficient to prevent accumulation of sludge even on such a flat roof. However, a frusto-conical roof is preferred for the reason that it is stronger than a flat roof and is kept clean by a relatively lesser degree of agitation.

The embodiment shown in Fig. 2 differs from that shown in Fig. 1 only in the construction of the baffle member 21 and the roof 38. Other parts of the apparatus are identical and repeated description thereof is unnecessary. In Fig. 2 the baffle member 21 has an upright portion 22 but the frusto-conical segment 24, as shown in the embodiment of Fig. 1, is omitted so that the bottom opening of the baffle 21 is defined by the upright member 22. The roof 38 is of such size as to project beyond the lower edge of the upright member 22, the effect again being to encompass an area greater than that defined by the bottom opening of the baffle member 21 and substantially coaxial therewith. The only difference in the two embodiments is that in Fig. 1 the roof member need not be as large as the upright member 22 because of the inverted frusto-conical section 24, while in the embodiment of Fig. 2 the roof member is preferably larger than the upright member, as shown, and must be at least substantially as large as the upright member to accomplish the purposes of the invention.

The apparatus described and illustrated herein is capable of accomplishing the functions of the apparatus defined in the aforementioned co-pending application, and the method described in said application may be carried out in the present apparatus. However, the apparatus herein described has the additional object of permitting aeration and agitation within the confines of the annular baffle, i. e. within the agitation zone of the sedimentation tank, to substantially any desired degree and to a degree far and above that permissible in conventional apparatus or in the apparatus defined in the aforementioned co-pending application.

We claim:
1. In clarification apparatus comprising a tank for containing a pool of liquid to be clarified and in which suspended sludge settles, an annular baffle in the tank with its lower edge disposed above the tank bottom and forming in the tank an outer quiescent zone and an inner zone with the two zones in communication under the baffle, a sludge outlet disposed in the tank in the portion of the tank bottom underlying the inner zone, and raking means for moving the settled sludge along the bottom of the tank from the outer quiescent zone and under the baffle to the sludge outlet, the combination which comprises a roof mounted above the raking means and extending substantially across the entire lower portion of the inner zone with its outer edge near the lower edge of the baffle, and agitating means disposed in the inner zone above the roof for admitting air into the liquid in the inner zone and causing it to circulate up and down between the lower portion of the zone overlying the roof and the upper portion of the zone.

2. Apparatus according to claim 1 wherein the roof slopes downwardly toward the periphery of the tank.

3. Apparatus according to claim 1 wherein the roof slopes downwardly toward the periphery of the tank and extends underneath the baffle.

4. In clarification apparatus comprising a tank for containing a pool of liquid to be clarified and in which suspended sludge settles, an annular baffle in the tank with its lower edge disposed above the tank bottom forming an outer quiescent zone and an inner zone with the two zones in communication under the baffle, a sludge outlet disposed in the tank in the portion of the tank bottom underlying the inner zone, and raking means for moving the settled sludge along the bottom of the tank from the outer quiescent zone and under the baffle to the sludge outlet, the combination which comprises an outwardly sloping roof mounted above the raking means and extending substantially across the entire inner zone, an inverted frusto-conical lip member fastened to the bottom of the baffle and extending toward the center of the tank, and agitating means disposed in the inner zone above the roof for admitting air into the liquid in the inner zone to cause it to circulate between the lower portion of the zone overlying the roof and the upper portion of the zone.

EARL M. KELLY.
ARTHUR M. KIVARI.

References Cited in the file of this patent
UNITED STATES PATENTS

| Number | Name | Date |
|---|---|---|
| 2,076,529 | Durdin | Apr. 13, 1937 |
| 2,370,356 | Kamp et al. | Feb. 27, 1945 |
| 2,429,316 | Green | Oct. 21, 1947 |
| 2,483,706 | Lind | Oct. 4, 1949 |